| (12) | United States Patent<br>Kraiter et al. | (10) Patent No.: US 9,090,734 B2<br>(45) Date of Patent: Jul. 28, 2015 |
|---|---|---|

(54) SMEAR RESISTANT INKJET INKS

(75) Inventors: Daniel C. Kraiter, Wilmington, DE (US); Jose Esteban Valentini, West Chester, PA (US); Xiaoqing Li, Newark, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 317 days.

(21) Appl. No.: 13/508,554

(22) PCT Filed: Nov. 10, 2010

(86) PCT No.: PCT/US2010/056110
§ 371 (c)(1),
(2), (4) Date: May 8, 2012

(87) PCT Pub. No.: WO2011/059998
PCT Pub. Date: May 19, 2011

(65) Prior Publication Data
US 2012/0223999 A1 Sep. 6, 2012

Related U.S. Application Data

(60) Provisional application No. 61/259,810, filed on Nov. 10, 2009.

(51) Int. Cl.
| B41J 2/01 | (2006.01) |
| C08G 18/44 | (2006.01) |
| B41J 2/21 | (2006.01) |
| C08G 18/08 | (2006.01) |
| C08G 18/12 | (2006.01) |
| C08G 18/40 | (2006.01) |
| C08G 18/42 | (2006.01) |
| C08G 18/48 | (2006.01) |
| C08G 18/66 | (2006.01) |
| C08L 75/04 | (2006.01) |
| C09D 11/324 | (2014.01) |
| C09D 11/326 | (2014.01) |

(52) U.S. Cl.
CPC .............. *C08G 18/44* (2013.01); *B41J 2/2107* (2013.01); *C08G 18/0823* (2013.01); *C08G 18/0828* (2013.01); *C08G 18/12* (2013.01); *C08G 18/4018* (2013.01); *C08G 18/4202* (2013.01); *C08G 18/4211* (2013.01); *C08G 18/4277* (2013.01); *C08G 18/4854* (2013.01); *C08G 18/6659* (2013.01); *C08G 18/6692* (2013.01); *C08L 75/04* (2013.01); *C09D 11/324* (2013.01); *C09D 11/326* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; B41M 5/0011; B41M 5/0017; B41M 7/00
USPC ............. 347/100, 95, 96, 88, 99, 21, 20, 102, 347/103; 106/31.6, 31.13, 31.27; 523/160, 523/161
See application file for complete search history.

(56) References Cited

U.S. PATENT DOCUMENTS

| 3,479,310 | A | 11/1969 | Bayer et al. |
| 4,108,814 | A | 8/1978 | Reiff et al. |
| 4,408,008 | A | 10/1983 | Markusch et al. |
| 6,852,156 | B2 | 2/2005 | Yeh et al. |
| 7,101,919 | B2 | 9/2006 | Hasegawa et al. |
| 7,176,248 | B2 | 2/2007 | Valentini et al. |
| 7,479,179 | B2 * | 1/2009 | Szajewski ..................... 106/31.6 |
| 2003/0184629 | A1 | 10/2003 | Valentini et al. |
| 2005/0054751 | A1 | 3/2005 | Namba et al. |
| 2005/0176848 | A1 * | 8/2005 | Chen et al. .................... 347/100 |
| 2006/0032397 | A1 | 2/2006 | Banning et al. |
| 2007/0100024 | A1 | 5/2007 | Gu et al. |
| 2008/0318009 | A1 | 12/2008 | Berge et al. |
| 2011/0288212 | A1 * | 11/2011 | Deiner et al. .................. 347/100 |

OTHER PUBLICATIONS

Corresponding case PCT/US 10/56110, International Search Report, US Patent Office, Alexandria, VA, Authorized Lee W. Young, Jan. 21, 2011.
Corresponding case PCT/US2010/56110, International Preliminary Report on Patentability, WIPO Office, Geneva, Switzerland, Authorized Officer Lingfei Bai, May 15, 2012.

* cited by examiner

*Primary Examiner* — Manish S Shah
(74) *Attorney, Agent, or Firm* — John H. Lamming

(57) ABSTRACT

Inkjet inks are provided, relating in particular to smear resistant inkjet inks, and even more particularly to smear resistant pigmented aqueous inkjet inks comprising polyurethane dispersions and self-dispersing pigments. The polyurethane dispersions have a glass transition temperature Tg greater than −30 ° C. to less than about 35 ° C. and have at least one of the following thermal properties: loss modulus E" of 1.7 to 5×10$^8$ pascals, and/or a peak tan delta is 0.23 to 0.65, where the glass transition temperature, peak tan delta and the loss modulus are measured by dynamic mechanical analysis on a film prepared from the polyurethane dispersion.

20 Claims, No Drawings

SMEAR RESISTANT INKJET INKS

CROSS REFERENCE TO RELATED APPLICATIONS

This application claims priority under 35 U.S.C. §119 from U.S. Provisional Application Ser. No. 61/259810, filed Nov. 10, 2009.

BACKGROUND OF THE INVENTION

Ink jet inks are provided, in particular to smear resistant inkjet inks, and even more particularly to smear resistant pigmented inkjet inks containing polyurethane dispersions that have a glass transition temperature Tg of greater than −30° C. to less than 35° C. and at to least one of the following thermal properties 1) loss modulus E" of 1.7 to $5\times10^8$ pascals, and 2) peak tan delta is 0.23 to 0.65. The pigments used are self dispersed pigments.

Both dyes and pigments have been used as colorants for inkjet inks. While dyes typically offer superior color properties compared to pigments, they tend to fade quickly and are more prone to rub off. Inks comprising pigments dispersed in aqueous media are advantageously superior to inks using water-soluble dyes in water-fastness and light-fastness of printed images.

Pigments suitable for aqueous inkjet inks are in general well-known in the art. Traditionally, pigments were stabilized by dispersing agents, such as polymeric dispersants or surfactants, to produce a stable dispersion of the pigment in the vehicle. More recently though, so-called "self-dispersible" or "self-dispersed" pigments (hereafter "SDP") have been developed. As the name would imply, SDPs are dispersible in water without dispersants.

SDPs are often advantageous over traditional dispersant stabilized pigments from the standpoint of greater stability and lower viscosity at the same pigment.

Although advantageous in some regards, penetrating pigment-based ink compositions may cause the color development to be somewhat poor when ink is printed on plain paper. Increasing the content of the pigment may improve color development but it generally also increases the viscosity of ink and thus is often unfavorable for the ejection stability of ink. However, the beneficial properties of SDPs allow these pigments to be loaded to higher levels with less impact on viscosity. Thus a penetrating ink having excellent color development is still possible by using SDPs.

Despite these potential advantages to the use of SDPs, inks formulated with SDPs tend to be somewhat poor in fixation on recording media, in particular plain paper. An example of poor fixation is when an ink is smeared when a highlighter pen is brushed across the inkjet printed image.

Still, there is need for dispersion stable, ejection stable inkjet inks comprising an SDP which can print with good color on plain paper and which are smear resistant.

SUMMARY OF THE INVENTION

An embodiment provides aqueous inkjet inks possessing good smear-fastness, water-fastness and high optical density (OD), while also providing good stability and jetting characteristics.

Another embodiment provides an aqueous inkjet ink comprising an SDP, a polyurethane dispersion and water, wherein the polyurethane has certain thermal properties when measured by dynamic mechanical analysis.

Thus, the aqueous inkjet ink composition, comprises, from about 1% to about 20% by weight self dispersed pigment, and from about 1% to about 10% by weight of a polyurethane dispersion wherein the polyurethane dispersion has a glass transition temperature Tg greater than −30° C. to less than 35° C. and has at least one of the following thermal properties
  a. loss modulus E" of 1.7 to $5\times10^8$ pascals,
  b. peak tan delta is 0.23 to 0.65,
wherein the glass transition temperature, peak tan delta and the loss modulus are measured by dynamic mechanical analysis on a film prepared from the polyurethane dispersion.

Yet another embodiment provides an aqueous inkjet ink comprising a self-dispersed pigment dispersed in an aqueous medium, wherein said aqueous inkjet ink further comprises a polyurethane dispersion wherein the polyurethane has the thermal properties described above.

The self dispersed pigment optionally comprises anionic hydrophilic chemical groups, and optionally, the chemical groups comprise carboxyl groups. These anionic hydrophilic groups may be obtained by oxidatively treating the surface with hypochlorous acid, sulfonic acid, or ozone so as to bond at least one functional group selected from the group consisting of carbonyl, carboxyl, hydroxyl and sulfone, onto the surface of the pigment. An oxidant may be ozone. Ozone is especially useful for making a self-dispersed carbon pigment from carbon black. The oxidized pigment may have an acid value of less than 3 μmoles/$M^2$.

Another embodiment provides a process for inkjet printing utilizing the aforementioned aqueous ink jet ink.

Another embodiment provides an ink set which contains, in addition to the aqueous inkjet ink comprising an SDP and a polyurethane which has the thermal properties indicated above, at least one other colored ink jet ink.

An embodiment provides that the inks are particularly advantageous for printing on plain paper.

These and other features and advantages of the present invention will be more readily understood by those of ordinary skill in the art from a reading of the following Detailed Description. One of skill can appreciate that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight. When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "dispersion" means a two phase system where one phase consists of finely, divided particles (often in the colloidal size range) distributed throughout a bulk substance, the particles being the dispersed or internal phase and the bulk substance the continuous or external phase. The bulk system is often an aqueous system.

As used herein, the term "pigment" means any substance usually in a powder form which imparts color to another substance or mixture. Additionally disperse dyes, white and black pigments are included in this definition.

As used herein, the term "HSD" means High Speed Dispersing.

As used herein, reference to enhanced or improved "print quality" means some aspect of optical density, gloss, and Distinctness of Image (DOI) of the printed images and fastness (resistance to ink removal from the printed image) is increased, including, for example, rub fastness (finger rub), water fastness (water drop) and smear fastness (high-lighter pen stroke).

As used herein, the term "OD" means optical density.

As used herein, the term "SDP" means self-dispersible or "self-dispersing" pigments.

As used herein, the term "aqueous vehicle" refers to water or a mixture of water and at least one water-soluble organic solvent (co-solvent).

As used herein, the term "substantially" means being of considerable degree, almost all.

As used herein, the term "Mn" means number average molecular weight as measured by size exclusion chromatography.

As used herein, the term "Mw" means weight average molecular weight as measured by size exclusion chromatography.

As used herein, the term "Pd" means the polydispersity which is the weight average molecular weight divided by the number average molecular weight.

As used herein, the term "d50" means the particle size at which 50% of the particles are smaller; "d95" means the particle size at which 95% of the particles are smaller.

As used herein, the term "cP" means centipoise, a viscosity unit.

As used herein, the term "pre-polymer" means the polymer that is an intermediate in a polymerization process, and can also be considered a polymer.

As used herein, the term "AN" means acid number, mg KOH/gram of solid polymer. As used herein, the term "neutralizing agents" means to embrace all types of agents that are useful for converting ionizable groups to the more hydrophilic ionic (salt) groups.

As used herein, the term "PUD" means the polyurethanes dispersions described herein.

As used herein, the term "DMIPA" means dimethylisopropylamine.

As used herein, the term "DMPA" means dimethylol propionic acid.

As used herein, the term "TEA" means triethylamine.

As used herein, the term "IPDI" means isophorone diisocyanate.

As used herein, the term "NCO prapolymers" means those polymers which have features of a polyurethane, but further reaction with isocyanates or isocyanate reactive groups to prepare a higher molecular weight polymer.

Polyurethane dispersions having glass transition temperatures (Tg) of greater than −30° C. to less than 35° C. provide good smear resistance. Polyurethanes further having a glass transition temperature indicated above and at least one of the following thermal properties
  a. loss modulus E" of 1.7 to $5 \times 10^8$ pascals,
  b. peak tan delta is 0.23 to 0.65,
wherein the glass transition temperature, peak tan delta and the loss modulus are measured by dynamic mechanical analysis on a film prepared from the polyurethane dispersion have improved smear resistance.

Smear resistance is measured by printing on plain paper, and then at various times after the printing, a yellow highlighter pen is brushed across the printed image. The amount of smearing is compared among the different polyurethanes tested. Those that had the Tg and loss modulus and/or peak tan Delta as shown above were superior for smear resistance. Another embodiment provides the polyurethane dispersions which have both the loss modulus E" and peak tan delta in the range indicated above.

In another embodiment the polyurethane dispersions that have glass transition temperatures Tg of greater than −30° C. to less than 35° C. with a loss modulus E" of from 2.4 to $4.5 \times 10^8$ pascals may be used. In another embodiment polyurethane dispersions that have glass transition temperatures Tg of greater than −30° C. to less than 35° C. with a peak tan delta may be from 0.24 to 0.45. In yet another embodiment, the polyurethane dispersions have both the loss modulus E" from 2.4 to $4.5 \times 10^8$ pascals and the peak tan delta 25' from 0.24 to 0.45.

It is known that some polyurethane dispersion additives improve the smear resistance of ink jet inks especially for self dispersed pigments. It is likely that the polyurethane dispersion forms a film when it is printed and it protects the self dispersed pigments which is most likely on the top of the substrate. Thus, while not being bound by theory, films were sought that had better adhesion to the substrate, but were not brittle. These properties lead to performing dynamic mechanical thermal testing described above to find polyurethanes which had higher glass transition temperatures Tg than previously described in U.S. Pat. No. 7,176,248. A film with too high a Tg proved to be brittle and 'break' away from the SDP on the substrate and/or the substrate and result in no improved smear resistance. However, a polyurethane with a Tg of −30 to 35 ° C. is not a sufficient description of the polyurethanes; they had to also have other properties that were characterized by the loss modulus and/or the peak tan delta. While not being bound by theory these thermal properties permit predicting whether the polyurethane film is sufficiently pliable such that it may deform under the stress of a smear test while retaining 'association' with the SDP particle on the surface of the substrate.

The use of dynamic mechanical analysis is well known for characterizing polymers through the study of their viscoelastic properties. Two parameters from these tests are E', the ratio of the in-phase stress to applied strain and E", the ratio of out-of-phase stress to strain. E' is related to the mechanical energy stored per cycle and E" is related to the energy converted to heat through viscous dissipation. E' is referred to as the storage modulus and E" is called the loss modulus. The material loss factor or loss tangent is tan $\delta$=E"/E' representing the ratio of energy dissipated to energy stored per cycle of deformation. In a physical sense the storage modulus is related to the stiffness of the material and the loss modulus is reflected in the damping capacity of the material. At peak tan $\delta$ values, viscous forces and elastic forces are balanced. Elastic forces tend to compensate for the deformation of the printed image induced by the highlighter pen during testing Tan Delta is the ratio of the Viscous to Elastic forces. At peak tan delta values, viscous forces and elastic forces are balanced. Elastic forces tend to compensate for the deformation of the image induced by the highlighter pen during testing. If tan delta is significantly higher or lower than peak value the images becomes too brittle or too soft and smears occur.

A general discussion of the dynamic mechanical analysis may be found in the *Encyclopedia of Polymer Science and Technology* in the Thermal Analysis of Polymers section.

Polyurethane Dispersions (PUDs)

In accordance with the present invention the term "polyurethane dispersion" refers to aqueous dispersions of polymers containing urethane groups and optionally urea groups, as that term is understood by those of ordinary skill in the art. These polymers also incorporate hydrophilic functionality to the extent required to maintain a stable dispersion of the polymer in water.

The polyurethanes are chosen based on evaluation of their thermal properties described above. In any given set of polyurethanes that have similar synthetic schemes, only one may have the thermal properties described above for the seemingly similarly prepared polyurethanes. The preparations of polyurethanes are described below.

The polyurethane dispersions are those in which the polymer is predominantly stabilized in the dispersion through incorporated ionic functionality, and particularly anionic functionality such as neutralized acid groups. These polyurethanes are called anionically stabilized polyurethane dispersions. Further details are provided below.

Such aqueous polyurethane dispersions may be prepared by a multi-step process in which an isocyanate rich (N=C=O, NCO) prepolymer is initially formed and subsequently chain extended in the aqueous phase optionally in the presence of a polyfunctional group chain extender. Polyurethanes which have excess isocyanate reactive groups may also be used.

Typically, in the polyurethane formation, a diisocyanate is reacted with a compound containing one or more isocyanate-reactive groups and at least one compound with isocyanate groups or isocyanate reactive groups which contain one acid or acid salt group to form an intermediate product. The molar ratio of isocyanate groups to isocyanate-reactive groups may vary from 1.0:1.5 to 1.0:0.67.

Suitable diisocyanates for reacting with the isocyanate-reactive compound containing ionic groups (or groups which may be rendered ionic via, for example, neutralization) are those which contain either aromatic, cycloaliphatic or aliphatic-bound isocyanate groups. More suitable diisocyanates include any diisocyanate useful in preparing polyurethanes and/or polyurethane-ureas from polyether glycols, diisocyanates and diols or amines may be used as well. Suitable polyisocyanates are those that contain either aromatic, cycloaliphatic or aliphatic groups bound to the isocyanate groups. Mixtures of these compounds may also be used. Suitable compounds are those with isocyanates bound to cycloaliphatic or aliphatic moieties. If aromatic isocyanates are used, cycloaliphatic or aliphatic isocyanates are suitably present as well. $R_1$ may be substituted with aliphatic groups.

Examples of suitable diisocyanates include, but are not limited to 2,4-toluene diisocyanate (TDI); 2,6-toluene diisocyanate; trimethyl hexamethylene diisocyanate (TMDI); 4,4'-diphenylmethane diisocyanate (MDI); 4,4'-dicyclohexylmethane diisocyanate ($H_{12}$MDI); 3,3'-dimethyl-4,4'-biphenyl diisbcyanate (TODI); Dodecane diisocyanate ($C_{12}$DI); m-tetramethylene xylylene diisocyanate (TMXDI); 1,4-benzene diisocyanate; trans-cyclohexane-1,4-diisocyanate; 1,5-naphthalene diisocyanate (NDI); 1,6-hexamethylene diisocyanate (HDI); 4,6-xylyene diisocyanate; isophorone diisocyanate (IPDI); and combinations thereof. IPDI and TMXDI are most suitable.

Small amounts, less than about 3 wt %, based on the weight of the diisocyanate, of monoisocyanates or polyisocyanates may be used in mixture with the diisocyanate. Examples of useful monoisocyanates include alkyl isocyanates such as octadecyl isocyanate and aryl isocyanates such as phenyl isocyanate. Examples of a polyisocyanate are triisocyanatotoluene HDI trimer (Desmodur 3300), and polymeric MDI (Mondur MR and MRS).

Isocyanate-reactive compounds containing acid groups, i.e., carboxylic acid groups, carboxylate groups, sulfonic acid groups, sulfonate groups, phosphoric acid groups and phosphonate groups, are chemically incorporated into the polyurethane to provide hydrophilicity and enable the polyurethane to be stably dispersed in an aqueous medium. The acid salts are formed by neutralizing the corresponding acid groups either prior to, during or after formation of the NCO prepolymer, suitably after formation of the NCO prepolymer. Isocyanate-reactive compounds containing sulfonic acid groups may be used.

Examples of sulfonic acids include diols with sulfonic acids substituents. An example of this is, N-bis(2-hydroxyethyl)-2-aminoethane-sulfonic acid.

Suitable compounds for incorporating carboxyl groups are described in U.S. Pat. No. 3,479,310 U.S. Pat. No. 4,108,814 and U.S. Pat. No. 4,408,008. The neutralizing agents for converting the carboxylic acid groups to carboxylate salt groups are described below.

Carboxylic group-containing compounds include the hydroxyl-carboxylic acids corresponding to the formula $(HO)_xQ(COOH)_y$, wherein Q represents a straight or branched, hydrocarbon radical containing 1 to 12 carbon atoms, x is 1 or 2, suitably 2; and y is 1 to 3, more suitably 1 or 2, and most suitably 1.

Examples of these hydroxy-carboxylic acids include citric acid, tartaric acid and hydroxypivalic acid.

Especially suitable acids are those of the above-mentioned formula wherein x=2 and y=1. These dihydroxy alkanoic acids are described in U.S. Pat. No. 3,412,054. Especially suitable dihydroxy alkanoic acids are the alpha, alpha-dimethylol alkanoic acids represented by the structural Formula I:

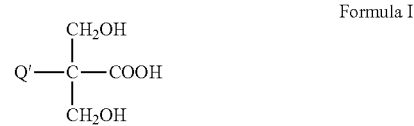

Formula I wherein Q' is hydrogen or an alkyl group containing 1 to 8 carbon atoms. A most suitable compound is alpha, alpha-dimethylol propionic acid (DMPA), i.e., wherein Q' is methyl in the above Formula I.

The acid groups are incorporated in an amount sufficient to provide an ionic group content of at least about 10, more suitably at least about 18 milligrams of KOH/gram of polyurethane resin solids. The upper limit for the content of acid groups is about 100, more suitably about 70, and most suitably about 60 milligrams per 1 g of polyurethane resin solids.

Suitable higher molecular weight isocyanate reactive groups may be polyols containing at least two hydroxy groups. These may be reacted with the pre-adducts to prepare the NCO prepolymers, and are those having a molecular weight of about 400 to about 6000, suitably about 800 to about 3000, and more suitably about 1000 to about 2500. The molecular weights are number average molecular weights (Mn) and are determined by end group analysis (OH number, hydroxyl analysis). Examples of these high molecular weight compounds include polyester polyols, polyether polyols, polyhydroxy polycarbonates, polyhydroxy polyacetals, polyhydroxy polyacrylates, polyhydroxy polyester amides and polyhydroxy polythioethers. A combination of the polyols may also be used in the polyurethane. The polyester polyols, polyether polyols and polyhydroxy polycarbonates are most suitable.

Poly(meth)acrylates containing hydroxyl groups include those common in the art of addition polymerization such as cationic, anionic, and radical polymerization and the like. Most suitable are alpha-omega diols. An example of these type of diols are those which are prepared by a "living"or "control" or chain transfer polymerization processes which enables the placement of one hydroxyl group at or near the termini of the polymer.

In addition to the abovementioned components which are suitably difunctional in the isocyanate polyaddition reaction, mono-functional and, even small portions of trifunctional and higher functional components generally known in polyurethane chemistry, such as trimethylolpropane or 4-isocyanantomethyl-1,8-octamethylene diisocyanate, may be used in special cases in which slight branching of the NCO prepolymer or polyurethane is desired. However, the NCO prepolymers should be substantially linear and this may be achieved by maintaining the average functionality of the prepolymer starting components at or below 2:1.

Other optional compounds include isocyanate-reactive compounds containing lateral or terminal, hydrophilic ethylene or propylene oxide units. The isocyanate-reactive compounds for incorporating lateral or terminal, hydrophilic ethylene oxide units may contain either one or two isocyanate-reactive groups, suitably hydroxy groups. Other optional compounds include isocyanate-reactive compounds containing self-condensing moieties. The content of these compounds are dependent upon the desired level of self-condensation necessary to provide the desirable resin properties. 3-amino-1-triethoxysilyl-propane is an example of a compound that will react with isocyanates through the amino group and yet self-condense through the silyl group when inverted into water.

The polyurethanes which are NCO rich are typical prepared by chain extending the NCO prepolymers. Suitable chain extenders are polyamine chain extenders, which may optionally be partially or wholly blocked. The preparation of aqueous polyurethane dispersions by mixing NCO prepolymers with at least partially blocked, diamine or hydrazine chain extenders in the absence of water and then adding the mixture to water. Upon contact with water the blocking agent is released and the resulting unblocked polyamine reacts with the NCO prepolymer to form the polyurethane.

Optionally the polyurethane of the polyurethane dispersion is based on an isocyanate-functional polyurethane prepolymer that has been chain extended wherein the isocyanate-functional polyurethane prepolymer comprises a prepolymer that has been prepared by reacting a diisocyanate with a t least one compound containing one or more isocyanate reactive groups and at least one or more isocyanate reactive groups with an acid or acid salt group where the equivalents of isocyanate functionality is greater than the equivalents of isocyanate-reactive functionality.

Suitable blocked amines and hydrazines include the reaction products of polyamines with ketones and aldehydes to form ketimines and aldimines, and the reaction of hydrazine with ketones and aldehydes to form ketazines, aldazines, ketone hydrazones and aldehyde hydrazones. The at least partially blocked polyamines contain at most one primary or secondary amino group and at least one blocked primary or secondary amino group which releases a free primary or secondary amino group in the presence of water.

Suitable polyamines for preparing the at least partially blocked polyamines have an average functionality, i.e., the number of amine nitrogens per molecule, of 2 to 6, suitably 2 to 4 and more suitably 2 to 3. The desired functionalities may be obtained by using mixtures of polyamines containing primary or secondary amino groups. The polyamines are generally aromatic, aliphatic or alicyclic amines and contain from 1 to 30, suitably 2 to 15 and more suitably 2 to 10 carbon atoms. These polyamines may contain additional substituents provided that they are not as reactive with isocyanate groups as the primary or secondary amines. These same polyamines may be partially or wholly blocked polyamines.

Suitable polyamines include 1-amino-3-aminomethyl-3,5, 5-trimethylcyclohexane (isophorone diamine or IPDA), bis-(4-amino-cyclohexyl)-methane, bis-(4-amino-3-methylcyclohexyl)-methane, 1,6-diaminohexane, ethylene diamine, diethylene triamine, triethylene tetramine, tetraethylene pentamine and pentaethylene hexamine. Hydrazine is also suitable.

The amount of chain extender when the polyurethane is NCO rich is dependent upon the number of terminal isocyanate groups in the prepolymer. The ratio of terminal isocyanate groups of the prepolymer to isocyanate-reactive groups of the chain extender is between about 1.0:0.6 and about 1.0:1.1, moresuitably between about 1.0:0.8 and about 1.0: 0.98, on an equivalent basis. Any isocyanate groups that are not chain extended with an amine will react with water, which functions as a diamine chain extender.

Chain extension may take place prior to addition of water in the process, but typically takes place by combining the NCO prepolyrner, chain extender, water and other optional components under agitation.

Other monomers and/or oligomers that will not participate chemically in the polyurethane synthesis steps maybe added. The addition may be anywhere in the synthetic cycle as long as there is no interference in the polyurethane synthesis. A specific example of a compatible oligomer/monomer is a styrene allyl alcohol, abbreviated SAA.

Molecular weight is also a characteristic of the polyurethane that may be used to define a polyurethane. The molecular weight is routinely reported as weight average molecular weight, Mw. The suitable molecular weight is more than 14,000 as Mw. The polyurethane binders are not limited to Gaussian distribution of molecular weight, but may have other distributions such as bimodal distributions.

The particle size of the polyurethane dispersions is typically in the range of about 30 to about 100,000 nm. A suitable range for polyurethane binders for inkjet inks is from about 30 to about 350 nm.

In order to have a stable dispersion, a-sufficient amount of the acid groups must be neutralized so that, when combined with the optional hydrophilic ethylene oxide units, the resulting polyurethane will remain stably dispersed irk the aqueous medium. Generally, at least about 75%, more-suitably at least about 90% of the acid groups, are neutralized to the corresponding carboxylate salt groups.

Suitable neutralizing agents for converting the acid groups to salt groups either before, during or after their incorporation into the NCO prepolymers, include tertiary amines, alkali metal cations, and ammonia. Suitable trialkyl substituted tertiary amines, such as trimethyl amine, tripropyl amine, dimethylcyclohexyl amine, and dimethylethyl amine may be used.

Neutralization may take place at any point in the process. A typical procedure includes at least some neutralization of the prepolymer, which is then chain extended in water in the presence of additional neutralizing agent.

The final product is a stable aqueous dispersion of polyurethane particles having solids content of up to about 60% by weight, suitably about 15 to about 60% by weight and more suitably about 30 to about 45% by weight. However, it is always possible to dilute the dispersions to any minimum solids content desired. In any convenient order of addition the stable aqueous dispersion of polyurethane particles, the ink vehicle, the self-dispersed pigment and other ink components are combined.

Self-Dispersible Pigments (SDPs)

As indicated previously, SDPs are in a general sense well-known to those of ordinary skill in the art.

Typically, SDPs are pigments that have been surface treated to render them self-dispersible in water such that no separate dispersant is needed. The pigments may be black, such as carbon black, or may be colored pigments such as PB 15:3 and 15:4 cyan, PR 122 and 123 magenta, PY 128 and 74 yellow.

The pigment may be treated on its surface so as, to bond at least one functional group selected from the group consisting of carbonyl, carboxyl, hydroxyl and sulfone groups, or a salt thereof, onto the surface of the pigment. This surface-treated pigment may be prepared by grafting a functional group or a molecule containing a functional group onto the surface of the pigment or by physical treatment (such as vacuum plasma), or chemical treatment (for example, oxidation with hypochlorous acid, sulfonic acid or the like). A single type or a plurality of types of functional groups may be grafted on one pigment particle. The type and the degree of grafting of the functional group(s) may be properly determined by taking into consideration, for example, dispersion stability in ink, color density, and drying properties at the front end of an ink jet head.

Black pigments usable in the present invention may be produced, for example, by methods described in U.S. Pat. No. 6,852,156. Carbon black treated by the method described in this publication has a surface-active hydrogen content which is neutralized with base to provide very stable dispersions in water. Application of this method to colored pigments is also possible. The suitable oxidant is ozone, especially for carbon black. A suitable oxidized pigment has an acid value of less than 3 μmoles/M$^2$.

Commercially available SDP products may also be used. Examples include Micro-jet CW 1 manufactured by Orient Chemical Industries, Ltd., and Cab-O-Jet 200 and 300 manufactured by Cabot Corporation.

A wide variety of organic and inorganic pigments, alone or in combination, are known in the art as suitable for inkjet. As with any pigmented inkjet ink, care must be taken to ensure that the pigment particles are small enough to avoid clogging or plugging the orifice of the nozzles that will be used to fire the ink. Small pigment particles also have an influence on the stability of the pigment dispersion, which is critical throughout the life of the ink.

Useful particle size is typically in the range of from about 0.005 micron to about 15 micron. The pigment particle size should range from about 0.005 to about 5 micron, more suitably from about 0.005 to about 1 micron, and most suitably from about 0.005 to about 0.3 micron.

Proportion of Main Ingredients

The pigment levels employed in the instant inks are those levels which are typically needed to impart the desired color density to the printed image. Typically, pigment levels are in the range of about 0.01 to about 20% by weight of the ink.

The polyurethane dispersion is chosen based on the thermal parameters described above, and the amounts used in the inks are dictated by the degree of fixation sought and the range of ink properties which may be tolerated. Typically, polyurethane dispersion levels will range up to about 10 weight %, suitably from about 0.1 to about 10%, more suitably about 0.2 to about 4% by weight of ink. Often, some degree of improved ink fixation may be gained even at very low levels of polyurethane dispersion. Better fixation is obtained at higher levels, but generally, at some point, viscosity is increased excessively and jetting performance becomes unacceptable. The right balance of properties must be determined for each circumstance, which determination may generally be made by routine experimentation well within the skill of those of ordinary skill in the art.

Combinations of two or more polyurethane dispersions may also be utilized. Polyurethanes dispersions may be used in combination with other binders, such as polyacrylate/polymethacrylates.

Other Ingredients

The inkjet ink may contain other ingredients well known in the art. For example, anionic, nonionic, cationic or amphoteric surfactants may be used. In aqueous inks, the surfactants are typically present in the amount of about 0.01 to about 5%, suitably about 0.2 to about 2%, based on the total weight of the ink.

Co-solvents, may be included to improve pluggage inhibition properties of the ink composition. This "pluggage" is characterized by observing plugged nozzles, which results in poor print quality.

Biocides may be used to inhibit growth of microorganisms.

Sequestering agents such as EDTA may also be included to eliminate deleterious effects of heavy metal impurities.

Other known additives may also be added to improve various properties of the ink compositions as desired. For example, penetrating agents such as glycol ethers and 1,2-alkanediols may be added to the formulation.

Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-iso-propyl ether.

Suitable 1,2-Alkanediols are 1,2-$C_{1-6}$ alkanediols, more suitably 1,2-hexanediol.

The amount of glycol ether(s) and 1,2-alkanediol(s) added must be properly determined, but is typically in the range of from about 1 to about 15% by weight and more typically about 2 to about 10% by weight, based on the total weight of the ink.

Thermal Properties of the Polyurethane Dispersions

The thermal properties of the polyurethanes were tested, by preparing films of the polyurethanes. Concentrated Polymer solutions (~40%) were diluted with water to 18% total solids. In addition butyl cellosolve up to 1% was added to the sample. Samples were placed in vials which in turn were deaerated for 3 hours in a vacuum chamber. Polymer solutions free of bubbles were gently poured into 50 mm PTFE dishes and dried overnight in the oven at 70 degrees C. Later samples were removed from the dishes, turned over and laid on PE film to further dry the bottom side. It was important to make films free of bubbles.

Film was cut to about 3 cm by 1 cm rectangle and clamped onto the sample holder of a SEIKOP DMS 210 Tensile Mode Analyzer. Temperatures in the chamber were varied from −150C to 100 C while the sample was deformed within the linear viscoelastic region. Deformation amplitude was not larger than 10 microns and the frequency 1 Hz. From tensile force data, Storage (elastic) and Loss (viscous) modulae were determined and plotted automatically. Glass transition temperatures were determined from the peak of the Loss Modulus curve.

Test Equipment used: Seiko Instruments DMS 210 (for Tensile configuration) Analyzers with the SDM 5600 Controller; Temperature Range: −150-500 C; available from RT Instruments; Woodland Calif.

Ink Properties

Jet velocity, separation length of the droplets, drop size and stream stability are greatly affected by the surface tension and the viscosity of the ink. Pigmented inkjet inks suitable for use with ink jet printing systems should have a surface tension in the range of about 20 mN/m (dynes/cm) to about 70 mN/m (dynes/cm), more suitably about 25 to about 40 mN/m (dynes/cm) at 25° C. Viscosity is in the range of about 1 mPa·s (cP) to about 30 mPa·s (cP), more suitably about 2 to about 20 mPa·s (cP) at 25° C. The ink has physical properties compatible with a wide range of ejecting conditions, i.e., driving frequency of the pen and the shape and size of the nozzle. The inks should have excellent storage stability for long periods. Further, the ink should not corrode parts of the inkjet printing device it comes in contact with, and it should be essentially odorless and non-toxic. Suitable inkjet print heads include (but are not limited to) those with piezo and thermal droplet generators.

Evaluation of Inkjet inks with Polyurethane Dispersions

The aqueous inkjet inks with polyurethane dispersions were prepared by adding in any convenient order the polyurethane dispersions, the self dispersed pigment, water, and other ingredients which were listed above of the ink.

The inks tested used a black SDP which was prepared, for example, by any one of Inventive Examples 1-7 in U.S. Pat. No. 6,852,156.

The inks may be evaluated by printing onto plain paper such as Hammermill Copy Plus and Xerox 4024 with an inkjet printer such as an Epson Stylus Color 980 with print driver set for: 720 dpi; no color adjustment; finest detail; high speed.

Optical density and color (LabCh) measurements are made using a Greytag spectro-densiometer set to "status I" (narrow band) and "absolute" for the optical density measurements.

Print quality is determined by printing a test pattern and observing the test pattern so printed. A pattern consisting squares (10 mm×10mm) are printed using 720 dpi either on Hammermill Copy Plus or Xerox 4200 papers. The printed squares are inspected with magnifying glasses for "white lines". Typically, the presence of white lines suggests nozzle clogging and/or misalignment. Samples are rated as follows. "P" (Poor) or 0-1—Large number of "white lines" present— "F" (Fair) or 2-3—Few "white lines" present—"G" or 4-5 No "white lines" present. A rating of fail is about the same as Poor and an OK rating is equivalent to Good. If the printer used does not have a 720 dpi setting, the "high quality" setting is used.

For inks without binder, water-fastness tends to be somewhat variable between different brands of plain paper. The polyurethane binders provided compensate for any lack of water-fastness such that the inventive inks routinely give good waterfastness regardless of paper used.

The Inks provided may achieve the beneficial image properties of high OD, water and smear resistance, in a formulation of relatively low viscosity, e.g. less than about 5 mPa.s (Brookfield viscometer with a LVT adapter at 20° C.); although no particular limitation on viscosity is implied.

To determine smear, prints were tested and a smear rating of 1, 2, 3, or 4 was assigned. A pattern consisting of five 4 mm-wide parallel stripes spaced about 7 mm apart was printed using a 720 dpi setting on the printer. One and two strokes from a highlighter, one on top of the other, were drawn across the five printed lines. Suitable highlighter pens are available, for example, under the trademarks Hi-Liter® from Avery Dennison Corp., Zebra® Pen from Zebra Pen Corp, Pilot from the Pilot Pen Company, highlighters from Sanford Company and Ecowriter from Mitsubishi Pencil Company. Highlighters used in the tests are from Avery Dennison and Sanford. These pens are both alkaline and acidic and have varying degrees of abrasiveness. This process was carried out on different parts of the test pattern at various time intervals, for example, at 1 minute, 10 minutes and one hour after printing the test pattern. The stripes were inspected and rated for smear-fastness Ratings from each stripe were added and an average calculated. The process was repeated on three different printed pages. P" (Poor) or 1—Strong evidence of significant smear, including distortion of the printed image; "F" (Fair) or 2 substantial evidence of smear, but little distortion of the printed image and substantial ink is transferred to the highlighter; G (Good) or 3 where some smearing of the ink is observed and little ink is transferred to the highlighter; and E (Excellent) or 4 where there is no observed smearing of the ink and no ink is transferred to the highlighter.

The molecular weights of the polyurethane dispersions are measured by size exclusion chromatography. A solution of polymer in tetrahydrofuran (THF) is injected into a series of columns that contain packings of porous material of a certain pore size. The solute and solvent molecules diffuse through the pores where the polymer is fractionated based on molecular size. The resulting data is then compared to polystyrene standards of known molecular weights and calculated using elution volume information.

The particle size for both the pigments and the polyurethane dispersions are determined by dynamic light scattering. For the examples, a Microtrac UPA 150 analyzer from Honeywell was used. The technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution.

The inks provided generally are storage stable. Thus, the instant inks may sustain elevated temperature in a closed container for extended periods (e.g. 70° C. for 7 days) without substantial increase in viscosity or particle size.

The benefits of the present invention are realized without any special post-treatment after printing. No "fixation" step is required such as heat or UV curing or treatment with a reaction solution, although such operations might be useful for other reasons and no particular limitations are implied.

EXAMPLES

In these Examples, the following components were utilized:

| COMPONENT | DESCRIPTION |
| --- | --- |
| SDP black | Prepared in a manner similar to process of U.S. Pat. No. 6,852,156 |
| Proxel | Anti-bacterial/anti-fungal from Avecia |
| Surfynols ®104E, 465, 485 and TG | Ethoxylated nonionic surfactant from Air Products |
| BYK 348 | Surfactant commercially available from BYK Chemie |

Other common chemicals were obtained from Aldrich or equivalent chemical supply source.

The polyurethanes are made with commonly known synthetic methods. In general the polyurethane components are added together in any convenient order. The chemical components are isocyanate reactive group compounds, isocyanate compounds and isocyanate reactive or isocyanate compounds with ionic substituent which stabilize the polyurethane dispersion. An organic solvent is often used for the initial reaction; followed by the addition of water to obtain a dispersion. The ionic substituent is neutralized prior to or when the water is added.

Synthesis of Polyurethane Dispersions

Table 1 lists various synthetic parameters for the polyurethanes tested. Synthetic parameters listed in Table 1 are as follows:

1. Diols are the isocyanate reactive groups and are
    a. PCD polycarbonate diol
    b. PCD/polyester diol, (a mixture of polycarbonate diol and polyester diol)
    c. Polyester diol
    d. Polyether diol
2. Diol MVV
3. Diol wt % of the active polyurethane components
4. isocyanate wt % of the active polyurethane components. Except where noted isophorone diisocyanate was used
5. Acid type in the compound with ionic substituent: "C" corresponds to a carboxylic acid type, and specifically dimethylol propionic acid and "S" corresponds to a sulfonic acid and specifically, N,N-bis(2-hydroxyethyl)-2-aminoethane-sulfonic acid
6. A neutralization agent
7. % of the ionic groups neutralized by the neutralization
8. Process modification notes whether the ionic group compounds are added before or after other diols. PMP corresponds to Prepolymer Mixing Process where solvent, diol, isocyanate, acid containing component are added all together. Acid 1$^{st}$ means the acid containing component is added to the solvent followed by addition of the isocyanate followed by addition of the diol. Acid 2$^{nd}$ correspond to adding is the diol and isocyanate reactants to the solvent; reacting such that all of the diol has reacted and then addition of the acid component
9. Reaction solvent: Acetone (herein referred to as Ace), N-methylpyrrolidinone (herein referred to as NMP)
10. PUD and $M_n$ and $M_w$ of the final polyurethane as measured by size exclusion chrometography Polyurethane Dispersion 17; Example Preparation To a dry, alkali- and acid-free flask, equipped with addition funnel, condenser, mechanical stirrer and nitrogen gas line, 177.5 g NMP, 56.2 g N,N-bis(2-hydroxyethyl)-2-aminoethane-sulfonic acid were added. The content was heated to 60° C. and mixed well. To the flask, 0.62 g DBTL was added as a shot and 171.1 g IPDI was fed to the flask via the addition funnel over a 15 minute period. Any residual IPDI was rinsed from the addition funnel into the flask with 20.4 g NMP.

The flask temperature was raised to 65° C., and then held for 415 minutes until all solid material reacted and dissolved. 366.2 g polyester diol (adipic acid/1, 6 hexanediol/isophthalic acid) was added to the reaction flask in 70-80 g increments to control the exotherm. The reaction mixture was allowed to react at 65° C. for 75 minutes, until NCO content was less than 1.64% (by weight). The mixture was cooled to 35° C. and 59.5 grams NMP were added to lower the viscosity.

528 g solution NaOH 2% was added over 3 minutes at a temperature of 35° C., followed by 560.1 g deionized water over 10 minutes and followed by 116.5 g ethylene diamine (herein called. EDA) 6.25% in water over 5 minutes, via a separate addition funnel, which was then rinsed with 200.0 g water. The mixture was stirred at room temperature for 1hr, and then held at 45° C. for 2 hrs.

The final polyurethane dispersion has a solids content of 26.4% (by weight), an average particle size ($d_{50}$) of 18nm and a Brookfield viscosity of 60 cPs (5 rpm).

Comparative Polyurethane Dispersion 2 Example Preparation

To a dry, alkali- and acid-free flask, equipped with an addition funnel, a condenser, stirrer and a nitrogen gas line, was added 385 g Desmophene C 1200 (a polyester carbonate diol commercially available from Bayer), 3.0 g Zonyl®TL (fluoro surfactant commercially available from DuPont), and 120 g acetone and 0.04 g DER. The contents were heated to 40° C. and mixed well. 122.7 g IPDI was then added to the flask via the addition funnel at 40° C over 60 minutes, with any residual IPDI being rinsed from the addition funnel into the flask with 15.5 g acetone.

The flask temperature was raised to 50° C., and then held for 30 minutes. 32.3 g DMPA followed by 21.9 g TEA was added to the flask via the addition funnel, which was then rinsed with 15.5 g acetone. The flask temperature was then raised again to 50° C. and held at 50° C. until NCO % was less than 1.45%.

With the temperature at 50° C., 705 g deionized (DI) water was added over 10 minutes, followed by 71 g EDA (as a 6.25% solution in water) over 5 minutes, via the addition funnel, which was then rinsed with 20.0 g water. The mixture was held at 50° C. for 1 hr. and then cooled to room temperature.

Acetone (~150.0 g) was removed under vacuum, leaving a final dispersion of polyurethane with about 35.0% solids by weight and 37 nm average particle size.

Inventive Examples 1-21

Polyurethane Dispersions

TABLE 1

Synthetic Parameters for Inventive Polyurethanes

| Description | Diol | Diol~Mw | Diol Wt % | Isocyanate Wt % | C. carboxylic, S, sulfonic' | Neutralization agent | Neutralization % | Process | Rxn. Solvent | PUD Mn 1000 | PUD Mw 1000 |
|---|---|---|---|---|---|---|---|---|---|---|---|
| PUD 1 | PCD | 600 | 58 | 36 | C | TEA | 90 | | Ace | 10.7 | 26.7 |
| PUD 2 | PC/PEst diol | 2000 | 64 | 29 | C | DMIPA | 100 | acid 2nd | NMP | | |
| PUD 3 | Polyester | 2000 | 75 | 20 | C | TEA | 90 | | Ace | 12.1 | 30.4 |
| PUD 4 | Polyester | 1000 | 60 | 28 | S | DMIPA | 100 | acid 1st | NMP | 10.8 | 29.3 |
| PUD 5 | PEther | 650 | 43 | (TDI) 36 | S | NaOH | 100 | acid 1st | NMP | 9.5 | 17.9 |
| PUD 6 | polyester | 560 | 54 | 38 | C | TEA | 90 | | Ace | 8.8 | 26.6 |
| PUD 7 | Polyether | 650 | 60 | 35 | C | TEA | 75 | acid 2nd | Ace | | |
| PUD 8 | Polyester | 560 | 55 | 36 | C | DMIPA | 90 | PMP | NMP | 3.9 | 14.6 |
| PUD 9 | Polyether | 650 | 57 | 34 | C | DMIPA | 90 | PMP | NMP | 3.7 | 22.8 |
| PUD 10 | Polyether | 650 | 57 | 34 | C | DMIPA | 90 | PMP | NMP | 5.7 | 26.4 |
| PUD 11 | PC/PEst diol | 2000 | 64 | 29 | C | NaOH | 100 | acid 2nd | NMP | | |
| PUD 12 | Polyether | 1000 | 67 | 28 | C | TEA | 75 | acid 2nd | Ace | | |
| PUD 13 | Polyether, PC/PEst | 1,700 | 71 | 23 | C | TEA | 76 | acid 2nd | Ace | | |
| PUD 14 | PC/PEst diol | 2000 | 64 | 29 | C | NaOH | 100 | acid 1st | NMP | | |
| PUD 15 | Polyether | 1400 | 70 | 24 | C | TEA | 75 | acid 2nd | Ace | | |
| PUD 16 | Polyester | 1000 | 60 | 28 | S | KOH | 100 | acid 1st | NMP | 15.7 | 27.1 |
| PUD 17 | Polyester | 1000 | 60 | 28 | S | NaOH | 100 | acid 1st | NMP | 11.1 | 27.2 |
| PUD 18 | Polyester | 1000 | 60 | 28 | S | LiON | 100 | acid 1st | NMP | 13.2 | 29.4 |
| PUD 19 | Polyester | 1000 | 60 | 28 | C | NaOH | 100 | acid 1st | NMP | 9.5 | 23.2 |
| PUD 20 | PCD | 2000 | 73 | 22 | C | TEA | 90 | | Ace | 21.4 | 36.4 |
| PUD 21 | PCD | 2000 | 73 | 22 | C | TEA | 90 | | Ace | 14.3 | 32.5 |

Blank cells indicate the parameter was not measured

Diols used:

PUD 1, Eternacol UH-50 1,6-hexanediol based polycarbonate diol from UBE Chemical PUD 2, 11, 13 and 14 Desmophene hexane diol based carbonate co-caprolactone diol commercially available from Bayer PUD 3 Stepanpol PD 56; ortho phthalate-diethylene glycol based aromatic polyester commercially available from Stepan PUD 4, 16, 17, 18 and 19 adipic acid/1,6 hexanediol/isophthalic acid PUD 5, 7, 9 and 10 polytetramethylene glycol, TERATHANE 650

PUD 6 and 8; Stepan PD 200LV ortho phthalate-diethylene glycol based aromatic poly-ester commercially available from Stepan PUD 12 polytetramethylene glycol, TERATHANE 1000

PUD 19 and 20, 1,6-hexanediol based polycarbonate diol Eternacol UH-200 commercially available from UBE Chemical Measured acid numbers for selected polyurethanes

PUD 5, 90

PUD 6, 30.6

PUD 17, 25

PUD 19, 30.6

PUD 9 and PUD 10 are synthetic replicates.

PUD 20 and PUD 21 are synthetic replicates.

Comparative Examples 1-9

Polyurethane Dispersions

TABLE 2

Synthetic Parameters for Comparative Polyurethanes

| Description | Diol | Diol~Mw | Diol Wt % | Isocyanate Wt % | Carboxylic acid, C | Neutralization agent | Neutralization % | Process | Rxn. Solvent | PUD Mn 1000 | PUD Mw 1000 |
|---|---|---|---|---|---|---|---|---|---|---|---|
| comp PUD 1 | See comment below | | | | | | | | | | |
| comp PUD 2 | PC/Pest | 2000 | 70 | 22 | C | TEA | 90 | acid 2nd | Ace | | |
| comp PUD 3 | PC/Pest | 2000 | 71 | 22 | C | TEA | 75 | acid 2nd | Ace | | |
| comp PUD 4 | polyether | 1400 | 70 | 24.5 | C | TEA | 75 | acid 2nd | Ace | | |
| comp PUD 5 | PC/Pest diol | 2000 | 71.5 | 23 | C | TEA | 70 | acid 2nd | Ace | 13.4 | 28.6 |
| comp PUD 6 | polyester | 1900 | 71.2 | 22.5 | C | TEA | 90 | acid 2nd | Ace | | |
| comp PUD 7 | PC/Pest | 2000 | 68 | 23 | C | TEA | 90 | acid 2nd | Ace | | |
| comp PUD 8 | PC/PEst | 2000 | 70 | 22 | C | TEA/ NaOH | 90 | acid 2nd | Ace | | |
| comp PUD 9 | Polyether/ acrylate diol mixture | 1000 | 64 | 27 | C | TEA/ NaOH | 90 | acid 2nd | Ace | | |

Blank cells mean that the parameter was not measured
Composition Notes: Comparative PUD 1 is Mace 85-302, a polyurethane dispersion commercially available from Mace Adhesives and Coatings, Dudley Massachusetts.
Diols used Comparison PUD 2, 3, 5, 7 and 8 Desmophene hexane diol based carbonate co-caprolactone diol commercially available from Bayer
Comparison PUD 4 polytetramethylene glycol, TERATHANE 1400
Comparison PUD 5 Priplast 3192, dimer acid (C36) based polyester diol commercially available from Unichema Ink Preparation and Testing All of the inks were prepared using a black SDP. To a slurry of black SDP in deionized water was added, in order, the polyurethane dispersion binders, glycerol, ethylene glycol, and Surfynol 465 surfactant. After mixing for 10-20 minutes, the pH was adjusted with triethanolamine to a final value of 8. The ink was then filtered through a 5 micron filter and degassed.

TABLE 3

Ink Composition

| Component | Weight Percent |
|---|---|
| SDP black | 6.5 |
| Polyurethane Binder | 1 |
| Glycerol | 9 |
| Ethylene glycol | 6 |
| 1,2 Hexanediol | 5 |
| EDTA 5% solution | |
| BYK 348 | 0.1 |
| Triethanolamine for pH adjustment | 0.05-0.1 |
| Water | Balance |
| TOTAL | 100 |

The inks were evaluated by printing onto plain paper with an Epson Stylus Color 980 with print driver set for: 720 dpi; no color adjustment; finest detail; high speed. The Smear test was done on these samples. The optical density was compared to results for Prints from Comparative PUD 1, with a "+" notation meaning the OD of the print was better than the comparative example, an "=" meaning the OD was about equal to the comparative example, and a "−" meaning the OD was less than the comparative example.

Table 4 shows the results for the Inventive Examples 1-21. The table shows the smear rating, optical density and the three thermal parameter test results for the polyurethane dispersions. The thermal tests were performed on the polyurethane films described above. Blank cells correspond to no data taken.

TABLE 4

Smear and Thermal Properties for Inventive Polyurethanes

| Description | smear rating | Optical Density | glass transition temperature | Peak tan delta | Loss Modulus, ×10$^8$ |
|---|---|---|---|---|---|
| PUD 1 | | | 34.5 | 1.06 | 2.33 |
| PUD 2 | 1 | = | 31 | 0.595 | 1.60 |
| PUD 3 | | | 30 | 0.959 | 3.68 |
| PUD 4 | 2 | = | 26 | 0.44 | 1.74 |
| PUD 5 | 4 | − − | 24.9 | 0.309 | 1.38 |
| PUD 6 | 3 | = | 20 | 0.526 | 3.51 |
| PUD 7 | 4 | = | 14 | 0.643 | 0.76 |
| PUD 8 | | | 14 | 0.558 | 4.33 |
| PUD 9 | | | 11 | 0.58 | 1.18 |
| PUD 10 | | | 11 | 0.586 | 1.04 |
| PUD 11 | 3 | = | −10 | 0.24 | 2.11 |
| PUD 12 | 4 | = | −11 | 0.519 | 0.60 |
| PUD 13 | 1 | = | −14 | 0.344 | 1.16 |
| PUD 14 | 0 | = | −16 | 0.27 | 0.90 |
| PUD 15 | 3 | + | −19 | 0.425 | 1.63 |
| PUD 16 | 2 | + | −20 | 0.22 | 2.51 |
| PUD 17 | 4 | − | −20 | 0.263 | 2.42 |
| PUD 18 | 2 | = | −20 | 0.15 | 2.41 |
| PUD 19 | | = | −22 | 0.229 | 1.33 |
| PUD 20 | | | −27 | 0.362 | 2.21 |
| PUD 21 | | | −29 | 0.336 | 1.79 |

The Polyurethane Dispersions when tested for thermal parameters which met both the loss modulus and the peak tan delta criteria for choosing the polyurethane are 4, 6, 8, 11, 17, 20, and 21.

Comparative Polyurethanes were formulated into inks in a manner similar to the Inventive Inks and tested. The results are reported in Table 5.

TABLE 5

Smear and Thermal Properties for Comparative Polyurethanes

| Description | smear rating | Optical Density | glass transition temperature | Peak tan delta | Loss Modulus, ×10$^8$ |
|---|---|---|---|---|---|
| comp PUD 1 | 2 | = | −25.1 | 0.1469 | 1.00 |
| comp PUD 2 | 3 | = | −35.3 | 0.2698 | 2.17 |
| comp PUD 3 | 0 | = | −37.3 | 0.2143 | 1.08 |
| comp PUD 4 | 0 | = | −56.2 | 0.1998 | 2.10 |
| comp PUD 5 | 2 | + | −39.5 | 0.3344 | 2.70 |
| comp PUD 6 | 3 | = | −41.5 | 0.3109 | 2.13 |
| comp PUD 7 | 2 | = | −33.1 | 0.2382 | 1.07 |
| comp PUD 8 | 2 | = | −40 | 0.299 | 2.37 |

The comparative polyurethane dispersions resulted in poorer smear performance than the inventive polyurethane dispersions.

We claim:

1. An aqueous ink jet ink composition, comprising from about 1% to about 20% by weight self dispersed pigment, and from about 1% to about 10% by weight of a polyurethane dispersion wherein the polyurethane dispersion has a glass transition temperature Tg greater than −30° C. to less than 35° C. and has at least one of the following thermal properties
   a. loss modulus E" of 1.7 to 5 ×10$^8$ pascals,
   b. peak tan delta is 0.23 to 0.65,
wherein the glass transition temperature Tg, peak tan delta and the loss modulus are measured by dynamic mechanical analysis on a film prepared from the polyurethane dispersion.

2. The aqueous ink jet ink composition of claim 1, where the polyurethane dispersion has loss modulus E" of from 1.7 to 5 ×10$^8$ pascals and the peak tan delta is from 0.23 to 0.65, wherein peak tan delta and the loss modulus are measured by dynamic mechanical analysis on a film prepared from the polyurethane dispersion.

3. An aqueous ink jet ink composition of claim 1, wherein the polyurethane dispersion has a loss modulus E" of from 2.4 to 4.5 ×10$^8$ Pascal's wherein the loss modulus is measured by dynamic mechanical analysis on a film prepared from the polyurethane dispersion.

4. An aqueous ink jet ink composition of claim 1, wherein the polyurethane dispersion has a peak tan delta from 0.24 to 0.45 wherein the peak tan delta is measured by dynamic mechanical analysis on a film prepared from the polyurethane dispersion.

5. An aqueous ink jet ink composition of claim 1, wherein the self-dispersed pigment is self-dispersed carbon black pigment comprising anionic hydrophilic chemical groups.

6. The ink of claim 5, wherein the anionic hydrophilic chemical groups on the self-dispersed carbon black pigment comprise carboxyl groups.

7. An aqueous ink jet ink composition of claim 1, wherein the self-dispersed pigment comprises a pigment that has been oxidatively treated on its surface with hypochlorous acid, sulfonic acid, or ozone so as to bond at least one functional group selected from the group consisting of carbonyl, carboxyl, hydroxyl and sulfone, onto the surface of the pigment.

8. The aqueous inkjet ink of claim 1, wherein the self-dispersed pigment comprises a pigment that has been oxidatively treated on its surface with ozone.

9. The aqueous inkjet ink of claim 1, wherein the polyurethane dispersion is an anionically stabilized polyurethane dispersion.

10. The aqueous inkjet ink of claim 1, wherein the polyurethane of the polyurethane dispersion has an acid number of 10 to 100 mg KOH/gram measured for polyurethane in the polyurethane dispersion.

11. The aqueous inkjet ink of claim 1, wherein the polyurethane of the polyurethane dispersion has weight average molecular weight of more than about 14,000.

12. An aqueous ink jet ink composition of claim 1 wherein the polyurethane of the polyurethane dispersion is substituted with a sulfonate ionic group.

13. The aqueous inkjet ink of claim 1, wherein a combination of two or more polyurethane dispersions is used.

14. The aqueous inkjet ink of claim 1, wherein the ink has a surface tension in the range of about 20 mN/m to about 70 mN/m at 25° C., and a viscosity in the range of about 1 mPa·s to about 30 mPa·s at 25° C.

15. A process for inkjet printing comprising the step of jetting an ink onto a substrate, wherein the ink is an aqueous inkjet ink comprising from about 1% to about 20% by weight self dispersed pigment, and from about 1% to about 10% by weight of a polyurethane dispersion wherein the polyurethane dispersion has a glass transition temperature Tg greater than −30° C. to less than 35° C. and has at least one of the following thermal properties
   a. loss modulus E" of 1.7 to 5×10$^8$ pascals,
   b. peak tan delta is 0.23 to 0.65,
wherein the glass transition temperature Tg, peak tan delta and the loss modulus are measured by dynamic mechanical analysis on a film prepared from the polyurethane dispersion.

16. The process of claim 15, wherein the substrate is plain paper.

17. The process of claim 15, wherein the self-dispersed pigment is a self-dispersed carbon black.

18. The process of claim 15, wherein the polyurethane dispersion is an anionically stabilized polyurethane dispersion.

19. The process of claim 15, wherein the ink comprises from about 0.01 to about 10% by weight of pigment, and from 0.1 to about 10% by weight of polyurethane dispersion, based on the weight of the ink.

20. The aqueous inkjet ink composition of claim 1, wherein $T_g$ of the polyurethane is between 11° C. and 34.5° C. inclusive.

* * * * *